US007400489B2

(12) United States Patent
Van Brocklin et al.

(10) Patent No.: US 7,400,489 B2
(45) Date of Patent: Jul. 15, 2008

(54) SYSTEM AND A METHOD OF DRIVING A PARALLEL-PLATE VARIABLE MICRO-ELECTROMECHANICAL CAPACITOR

(75) Inventors: Andrew L. Van Brocklin, Corvallis, OR (US); Eric Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/763,345

(22) Filed: Jan. 23, 2004

(65) Prior Publication Data

US 2004/0227493 A1 Nov. 18, 2004

Related U.S. Application Data

(63) Continuation-in-part of application No. 10/428,168, filed on Apr. 30, 2003, now Pat. No. 6,829,132.

(51) Int. Cl.
*H01G 5/01* (2006.01)
*F16K 31/02* (2006.01)

(52) U.S. Cl. ....................... 361/278; 361/277; 361/281; 257/415; 257/E23.106; 257/E29.275; 251/129.04

(58) Field of Classification Search ................. 257/415, 257/E29.323; 310/309; 631/235, 277; 361/277, 361/278
See application file for complete search history.

(56) References Cited

U.S. PATENT DOCUMENTS

| | | | | |
|---|---|---|---|---|
| 5,889,708 | A | 3/1999 | Hwang | |
| 6,140,737 | A * | 10/2000 | Boie | 310/309 |
| 6,657,421 | B1 | 12/2003 | Pastor et al. | |
| 7,085,121 | B2 * | 8/2006 | Lynch et al. | 361/277 |
| 2003/0006777 | A1 * | 1/2003 | Murphy | 324/457 |

* cited by examiner

*Primary Examiner*—Dao H Nguyen

(57) ABSTRACT

A method of driving a parallel-plate variable micro-electromechanical capacitor includes establishing a first charge differential across first and second conductive plates of a variable capacitor in which the first and second conductive plates are separated by a variable gap distance, isolating the first and second plates for a first duration, decreasing the charge differential to a second charge differential which is less than the first charge differential and in which the second charge differential corresponds to a second value of the variable gap distance.

25 Claims, 8 Drawing Sheets

SYSTEM AND A METHOD OF DRIVING A PARALLEL-PLATE VARIABLE MICRO-ELECTROMECHANICAL CAPACITOR

RELATED APPLICATIONS

This application is a continuation-in-part of U.S. application Ser. No. 10/428,168, by Eric T. Martin et al., entitled: "Charge Control of Micro-Electromechanical Device," filed Apr. 30, 2003, now U.S. Pat. No. 6,829,132, which is incorporated herein by reference in its entirety.

BACKGROUND

Micro-electromechanical systems (MEMS) are systems which are developed using thin film technology and which include both electrical and micro mechanical components. MEMS devices are used in a variety of applications such as optical display systems, pressure sensors, flow sensors, and charge control actuators. MEMS devices use electrostatic force or energy to move or monitor the movement of micromechanical components. In one type of MEMS device, to achieve a desired result, a gap distance between electrodes is controlled by balancing an electrostatic force and a mechanical restoring force. Typically, digital MEMS devices use two discrete gap distances while analog MEMS devices use variable gap distances.

Such MEMS devices have been developed using a variety of approaches. In one approach, a deformable deflective membrane is positioned over an electrode and is electrostatically attracted to the electrode. Other approaches use flaps or beams of silicon or aluminum, which form a top conducting layer. With optical applications, the conducting layer is reflective while the deflective membrane is deformed using electrostatic force to direct light, which is incident upon the conducting layer.

One approach for controlling the gap distance between electrodes is to apply a continuous control voltage to the electrodes, wherein the control voltage is increased to decrease the gap distance, and vice-versa. However, this approach suffers from electrostatic instability that greatly reduces a useable operating range over which the gap distance can be effectively controlled. In addition, the speed with which the gap distance may be changed depends primarily on the physical characteristics of the MEMS device. When the voltage is changed, the gap distance between the electrodes lags the change of voltage as the MEMS device settles to its final position.

SUMMARY

A method of driving a parallel-plate variable micro-electromechanical capacitor includes establishing a first charge differential across first and second conductive plates of a variable capacitor in which the first and second conductive plates are separated by a variable gap distance, isolating the first and second plates for a first duration, decreasing the charge differential to a second charge differential which is less than the first charge differential and in which the second charge differential corresponds to a second value of the variable gap distance.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the present apparatus and method.

Throughout the drawings, identical reference numbers designate similar, but not necessarily identical, elements.

DETAILED DESCRIPTION

A method of driving a parallel-plate variable micro-electromechanical capacitor includes establishing a first charge differential across first and second conductive plates of a variable capacitor in which the first and second conductive plates are separated by a variable gap distance, isolating the first and second plates for a first duration, decreasing the charge differential to a second charge differential which is less than the first charge differential and in which the second charge differential corresponds to a second value of the variable gap distance.

As used herein and in the appended claims, the terms "transistor" and "switch" are meant to be broadly understood as any device or structure that is selectively activated in response to a signal.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
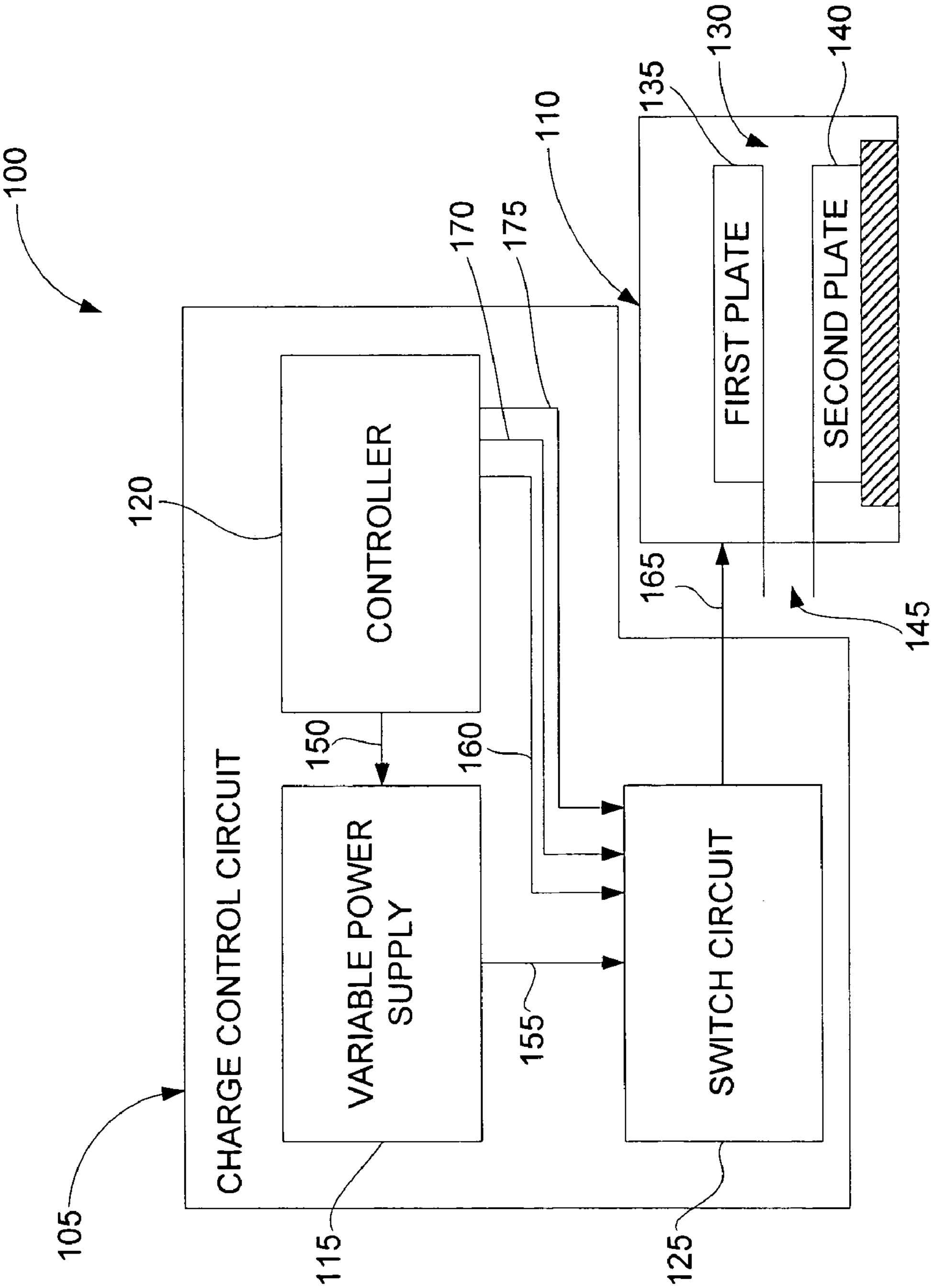
FIG. 1 is a simple block diagram illustrating a MEMS according to one exemplary embodiment.

FIG. 1 is a block diagram illustrating an exemplary embodiment of a micro-electromechanical system (MEMS) (100). The MEMS (100) includes a charge control circuit (105) and a micro-electromechanical device (MEM device) (110). The charge control circuit (105) further includes a variable power supply (115), a controller (120), and a switch circuit (125). The MEM device (110) further includes a variable capacitor (130) including a first conductive plate (135) and a second conductive plate (140) separated by a variable gap distance (145). The charge control circuit (105) is configured to provide a selected voltage to the variable capacitor (130) at a level higher than that required to charge the variable capacitor (130) to a second or final value. This process, which may be referred to as overdriving the voltage, helps move the first and second plates (135, 140) to their final mechanical position more quickly, as will be discussed in more detail below.

According to one exemplary embodiment, the variable power supply (115) is a variable voltage source configured to receive a voltage select signal from controller (120) via a path (150). The variable power supply (115) provides the selected voltage based on the voltage select signal to the switch circuit (125) via a path (155).

The variable gap distance (145) that separates the first conductive plate (135) and the second conductive plate (140) is a function of a magnitude of a stored charge on the variable capacitor (130). In order to accommodate the relative motion between the first conductive plate (135) and the second conductive plate (140), either of the conductive plates may be fixed while the other is moveable. For ease of reference, the second conductive plate (140) will be considered as the fixed plate according to the present exemplary embodiment. The variable gap distance (145) may be maximized by placing the first and second plates (135, 140) at the same initial electromechanical state. This initial state may be a minimum value or charge on the plates and may be established by coupling each of the first and second plates (135, 140) to separate clear voltages, as will be discussed in more detail below.

The charge control circuit (105) is configured to control the MEM device (110) by applying a selected voltage provided by the variable power supply (115) between the first and second conductive plates (135, 140) for a predetermined duration to thereby cause a stored charge of a desired magnitude to accumulate on the variable capacitor (130). As previously discussed, the charge stored on the variable capacitor (130) corresponds to the electrostatic attractive force between the first and second plates (135, 140). Accordingly, the greater the charge that is stored on the variable capacitor (130), the greater the electrostatic attraction between the first and second plates (135, 140).

In addition, the switch circuit (125) is configured to receive an enable signal of a predetermined duration via a path (160) and, in response to the enable signal, to apply a selected voltage level during the predetermined duration period to the MEM device (110) via a path (165) to thereby cause a stored charge having a desired magnitude to accumulate on the variable capacitor (130). In one exemplary embodiment, the switch circuit (125) is configured to receive a clear signal from the controller (120) via a path (170) and, in response to the clear signal, to remove a potential stored charge on the variable capacitor (130). Removing the stored charge places the variable capacitor (130) at a known charge level prior to applying the reference voltage having the selected voltage level.

The initial selected voltage applied to the variable capacitor (130) may provide more charge to the MEM device (110) than the charge associated with the final desired gap. In other words, the selected voltage applied may cause a larger amount of charge to initially accumulate on the variable capacitor (130) than the desired final charge value, and hence the corresponding final variable gap distance (145). This charge is stored on the variable capacitor (130) in response to a charge signal sent by the controller (120) to the switch circuit (125) by way of a charge control path (175). The variable capacitor (130) may be moved to its final mechanical position more quickly by initially increasing the level of the voltage applied to the variable capacitor (130) and by subsequently removing a pre-selected amount of charge.

According to one exemplary embodiment, a selected amount of charge is removed from the first and second plates (135, 140) in response to a subsequent charge regulation signal via the same path (170) used for the clear signal. As previously discussed, the reference voltage applied to the first and second plates (135, 140) corresponds to a higher amount of charge initially stored on the first and second plates (135, 140) that that which corresponds to the final gap value. The charge regulation signal results in the removal of a pre-selected amount of charge from the first and second plates (135, 140). While the variable capacitor (130) has the larger amount of charge stored thereon, the first and second plates (135, 140) move more quickly toward each than they would if they were only charged with the final charge value. As the variable gap distance (145) approaches its desired final value, the pre-selected amount of charge is removed. The first and second plates (135, 140) are then allowed to mechanically settle to the final variable gap distance (145).

As an alternative to using the clear signal to remove the selected amount of charge, the selected amount of charge may be removed by adjusting a $V_{REF}$ to an overdrive compensation voltage, after which the enable and charge enable signal may be given. In these situations, $V_{REF}$ serves to both charge the variable capacitor with an overdriven charge and to remove a selected amount of charge.

Exemplary Implementation and Operation

Figure 2:
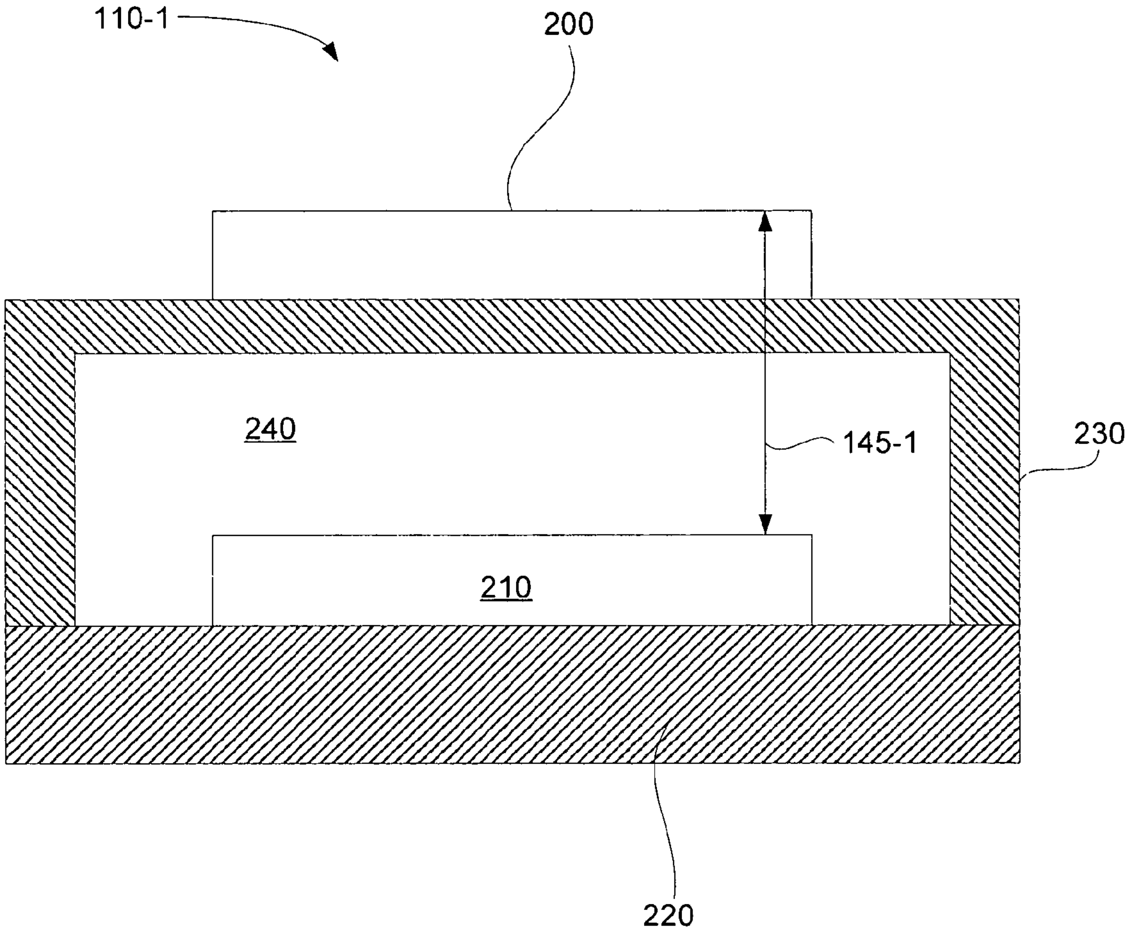
FIG. 2 is a cross-sectional view illustrating a MEM device according to one exemplary embodiment.

FIG. 2 is a diagram illustrating an exemplary embodiment of a MEM device (110-1). In the exemplary embodiment, the MEM device (110-1) displays, at least partially, a pixel of a displayable image. The MEM device (110-1) includes a top reflector (200), a bottom reflector (210), a flexure (220), and a spring mechanism (230). A resonant optical cavity (240) is defined by the reflectors (200, 210). The two reflectors (200, 210) are separated by a variable gap distance (145-1). The top reflector (200) may be semi-transparent or semi-reflective and used with a bottom reflector (210) that may be highly reflective or completely reflective or vice-versa. The spring mechanism (230) may be any suitable flexible material, such as a polymer, that has linear or non-linear spring functionality.

The optical cavity (240) can be adjusted to select a visible wavelength at a particular intensity using optical interference. Depending on the configuration of the MEM device (110-1), the optical cavity (240) can either reflect or transmit the wavelength at the desired intensity. That is, the optical cavity (240) can be reflective or transmissive in nature. According to this exemplary embodiment, no light is generated by the optical cavity (240). Rather, the MEM device (110-1) relies on ambient light or other external sources of light (not shown). The visible wavelength transmitted by the optical cavity (240) and its intensity are dependent on the gap distance (145-1) between the top and bottom reflectors (200, 210). As a result, the optical cavity (240) can be tuned to a desired wavelength at a desired intensity by controlling the gap distance (145-1)

The flexure (220) and the spring mechanism (230) allow the gap distance (145-1) to vary when an appropriate amount of charge has been stored on the reflectors (200, 210), such that a desired wavelength at a desired intensity is selected. This final charge, and the corresponding voltage, is determined in accordance with the following Equation I, which provides the force of attraction between the reflectors (200, 210). Accordingly, the reflectors (200, 210) and the variable gap distance (145-1) act as a parallel plate capacitor which does not take into account fringing fields.

$$F = \frac{\varepsilon_0 V^2 A}{2d^2}, \quad \text{Equation I}$$

where $\epsilon_0$ is the permittivity of free space, V is the voltage across the reflectors (200, 210), A is the area of each of the reflectors (200, 210), and d is the instantaneous gap distance (145-1). Thus, a one volt potential across a 70 micron square pixel, with a gap distance (145-1) of 0.25 microns yields an electrostatic force of $7\times10^{-7}$ Newtons (N).

Therefore, an amount of charge corresponding to a small voltage between the reflectors (200, 210) provides sufficient force to move the top reflector (200) and hold it against gravity and other forces such as physical shock. The electrostatic charge stored in the reflectors (200, 210) is sufficient to hold the top reflector (200) in place without additional power.

The force defined in Equation I is balanced with the linear spring force provided by the spring mechanism (230). This force is characterized by a second equation.

Equation II:

$$F=k(d_0-d),$$

where k is the linear spring constant of the spring mechanism (230), $d_0$ is the initial value of the gap distance (145-1), and d is the instantaneous gap distance (145-1).

As discussed previously, the range in which the forces of Equations I and II are in stable equilibrium using voltage control occurs when the value $(d-d_0)$ is between 0 and $d_0/3$. At $(d-d_0)>d_0/3$, the electrostatic force of attraction of Equation I over comes the spring force of Equation II such that the reflectors (200, 210) snap together. This occurs because when the variable gap distance d is less than $d_0/3$, excess charge is drawn onto the reflectors (200, 210) due to an increased capacitance, which in turn increases the attractive force of Equation I between the reflectors (200, 210) thereby causing them to be drawn together.

However, the force between the reflectors (200, 210) of Equation I can alternatively be written as a function of charge according to a third equation.

$$F = \frac{-Q^2}{2\varepsilon A}, \quad \text{Equation III}$$

where Q is the charge on the capacitor.

With the force F as a function of charge Q rather than d, it can be seen that the variable gap distance (145-1) can be controlled over the entire gap distance, such as a range from nearly 0 to $d_0$, by controlling the amount of charge on the reflectors (200, 210) rather than voltage.

Furthermore, the MEM device (110-1) has a mechanical time constant that causes delays in the movement of the reflector (200) resulting from changes in charge Q on the variable capacitor. The mechanical time constant can be controlled by, among other things, the material used in the spring mechanism (230) and by the environment in which the MEM device (110-1) operates. For example, the mechanical time constant of the MEM device (110-1) will have one value when operating in air and another value when operating in an environment of helium.

The charge control circuit (105; FIG. 1) utilizes each of the above-mentioned characteristics to control the gap distance (145-1) over substantially the entire gap. By applying a selectable control voltage to the MEM device (110-1) based on a duration of an enable signal, where the duration is less than the mechanical time constant of the MEM device (110-1), the variable capacitance of the MEM device (110-1) appears to be "fixed" for the duration of time that the reference voltage is applied. As a result, the desired charge, Q, accumulated on the reflectors (200, 210) from the application of the selected reference voltage can be determined by a fourth equation, Equation IV.

Equation IV:

$$Q=C_{INT}V_{REF}$$

where $V_{REF}$ is the selected reference voltage and $C_{INT}$ is the initial capacitance of the MEM device (110-1).

Accordingly, applying a relatively higher reference voltage to the top and bottom reflectors (200, 210) results in an initially larger charge differential. The larger charge differential initially established between the top and bottom reflectors (200, 210) results in a larger force between the top and bottom reflectors (200, 210). This larger force causes a corresponding increase in the speed with which the top and bottom reflectors (200, 210) move toward each other, as the value of the variable gap distance (145-1) decreases. As the variable gap distance (145-1) approaches its desired or intended value, a pre-selected or final charge is established between the top and bottom reflectors (200, 210). Once the final charge value has been established on the top and bottom reflectors (200, 210), the MEM device (110-1) is floated, or tri-stated, thus preventing the charge state from substantially fluctuating and further enabling effective control of the gap distance for an increased control range relative to direct voltage control of the MEM device (110-1).

As a result of the increased charge differential between the reflectors (200, 210), the reflectors (200, 210) may be moved to their final positions over a time interval that is substantially less than the time required to mechanically settle the MEM device (110-1) after applying an initial reference voltage corresponding to the final charge value.

Although the preceding paragraphs are described in the context of an ideal parallel-plate capacitor and an ideal linear spring restoring force, those of ordinary skill within the art can appreciate that the principle described can be adapted to other MEM devices including, but in no way limited to, interference-based or diffraction-based display devices, parallel plate actuators, non-linear springs, and other types of capacitors.

FIGS. 3A-3E are schematic representations of a MEMS (100-1) which allows for faster movement of first and second plates (135-1, 140-1) of a variable capacitor (130-1). The plates (135-1, 140-1) are moved more quickly to their final position by overdriving the voltage applied to the variable capacitor (130-1) and hence the charge differential between the first and second plates (135-1, 140-1).

Figure 3A:
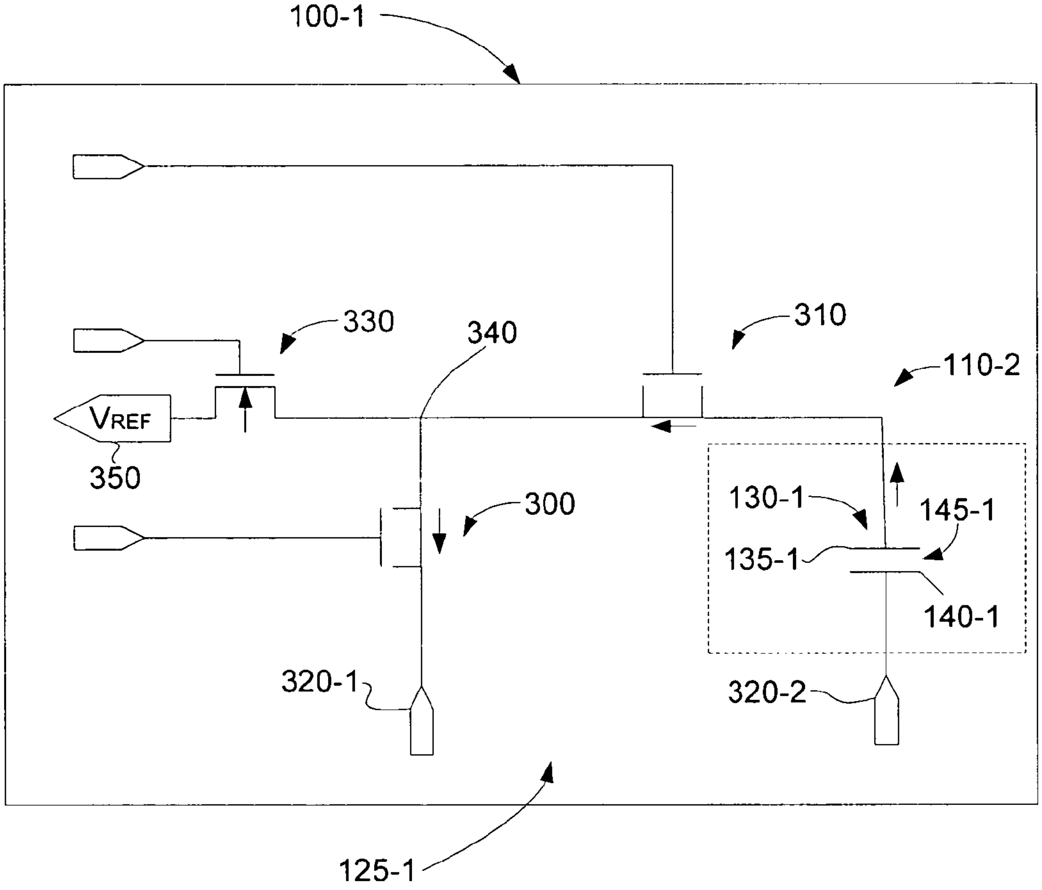
FIG. 3A is a schematic diagram illustrating an MEMS according to one exemplary embodiment as a charge differential is being removed from a variable capacitor.

FIG. 3A is a schematic representation of the MEMS (100-1) in an initial state. The MEMS includes a clear transistor (300), a first or enable transistor (310), first and second clear nodes (320-1, 320-2), a second or charge enable transistor (330), and a variable capacitor (130-1). Switch type devices may be used in place of the transistors. The initial state may be established after placing the MEMS in a known charge state, as previously discussed. In the initial state, the top or first plate (135-1) is coupled to the first clear node (320-1) by clear transistor (300) while the second or bottom plate (140-1) is coupled to the second clear node (320-2).

More specifically, in the illustrated implementation, the first plate (135-1) is coupled to the first clear node (320-1), which is set to the first clear voltage by providing a path there between. In the MEMS (100-1) illustrated in FIG. 3A, the clear transistor (300) and the enable transistor (310) are on while the charge enable transistor (330) is off. As a result, the first plate (130-1) is coupled to first clear node (320-1), which is set to the first clear voltage.

As previously stated, the second or bottom plate (140-1) is coupled to the node 320-2, which is set to the second clear voltage. The first and second clear voltages are at substantially the same voltage level, such that coupling the first and second plates (135-1, 140-1) thereto places the first and second plates (135-1, 140-1) in substantially identical charge states. In this condition, in which there is no charge differential between the first and second plates (135-1, 140-1), the variable gap distance (145-1) is at the largest value.

In some situations, it may be desirable to clear the MEMS device to a known charge state other than the state where there is no charge differential between the two plates. In such cases, the voltage levels on the first and second clear nodes (320-1, 320-2) may be independently controlled to place the first and second plates (135-1, 140-1) to a known charge state corresponding to a known variable gap distance (145-1).

Figure 3B:
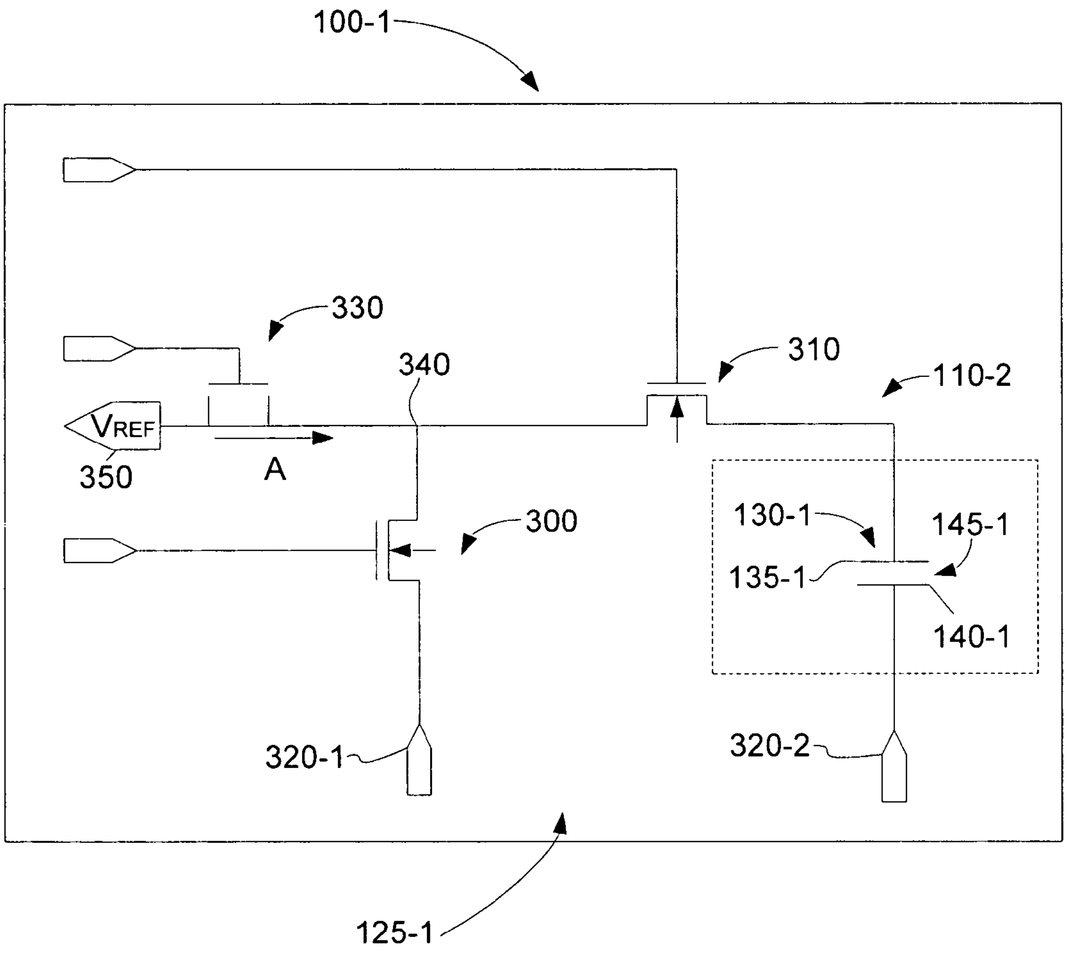
FIG. 3B is a schematic diagram illustrating an MEMS during a pre-charging operation according to one exemplary embodiment.

FIG. 3B is a schematic representation of the MEMS (100-1) as the input node (340) is pre-charged. The input node (340) is pre-charged after the variable capacitor (130-1) has been reset. The input node (340) is pre-charged at a selected, over driven reference voltage by turning off the enable transistor (310) and the clear transistor (300) and turning on the charge enable transistor (330). The pre-charge is larger in magnitude than the value of a charge corresponding to a final desired variable gap distance (145-1) between the first and second plates (135-1, 140-1). The input node (340) is charged because, as previously mentioned, the clear transistor (300) and the enable transistor (310) are off. As a result, the drain of the clear transistor (300) and the source of the enable transistor (310) are isolated from the capacitor node (110-2) and first clear node (320-1). The current flow of the accumulated charge is represented by the large arrow (A).

Figure 3C:
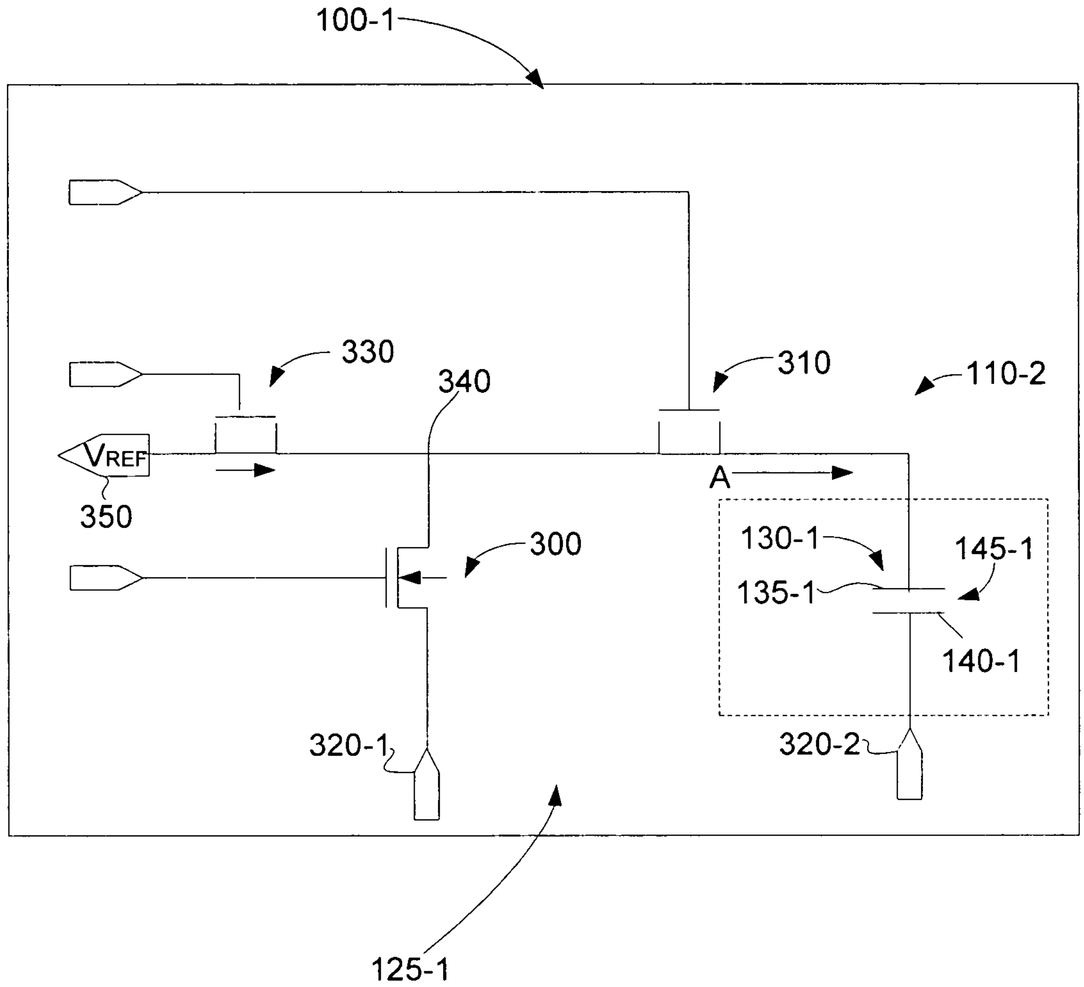
FIG. 3C is a schematic diagram illustrating an MEMS during a charge pulsing operation according to one exemplary embodiment.

FIG. 3C is a schematic representation of the MEMS (100-1) as a charge is pulsed to the variable capacitor (130-1). As shown in FIG. 3C, the charge enable transistor (330) is on, as is the enable transistor (310), causing the enable transistor (310) and the charge enable transistor (330) to act as conductors, thereby establishing a path between $V_{REF}$ (350) and the first conductive plate (135-1). As previously discussed, $V_{REF}$ (350) is over driven, such that the charge differential between the first and second plates (135-1, 140-1) is larger than the final desired charge value. The final charge value corresponds directly to the desired variable gap distance (145-1). The input node (340) is prevented from dropping to the first clear voltage existing on the first clear node (320-1) because the clear transistor (300) is off. Accordingly, the charge that has accumulated on the input node (340) is able to flow, or is pulsed to the variable capacitor (130-1). The pulse of charge flows across the enable transistor (310) to the first plate (135-1). The time that the enable transistor (310) is on or is held in the conductive state is known as the pulse duration.

The pulse duration is a period of time that is less than the mechanical time constant of the MEM device (110-2) as explained above. Further, the pulse duration may be at least as long as the electrical time constant or the RC time constant of the variable capacitor and corresponding circuitry of the MEMS (100-1). As previously discussed, the mechanical time constant causes delays in the movement of the first and second plates (135-1, 140-1) resulting from changes in charge Q on the variable capacitor (130-1). Accordingly, by applying a selectable control voltage from $V_{REF}$ (350) to the MEM device (110-2) based on the duration of the enable signal, the variable capacitance of the MEM device (110-2) appears to be "fixed" for the duration that the reference voltage is applied.

Further, by over driving the reference voltage (350) for the duration of the enable signal, the resulting charge differential between the first and second plates (135-1, 140-1) is larger than that required to move the variable gap distance (145-1) to its final value. The larger charge causes a larger force of attraction between the two plates (135-1, 140-1). This larger force of attraction causes the two plates (135-1, 140-1) to move more quickly toward each other, as previously discussed.

Figure 3D:
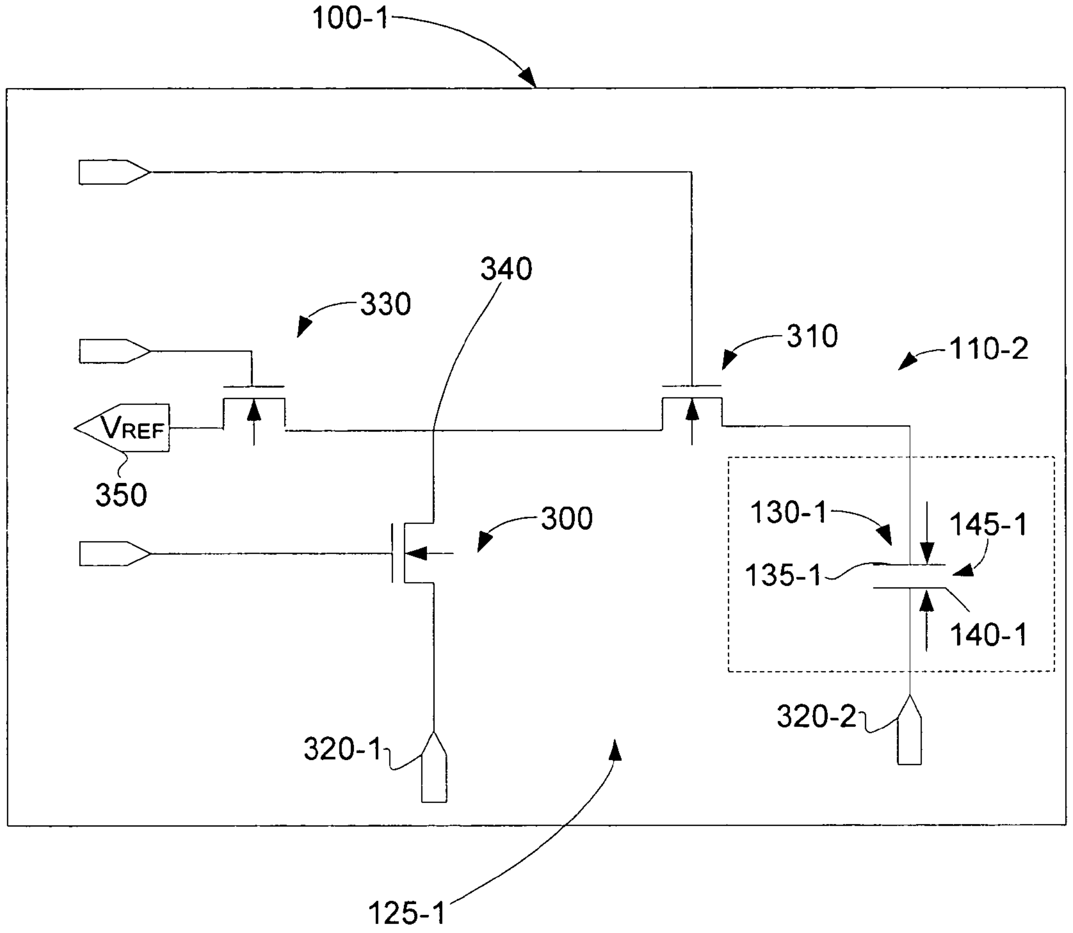
FIG. 3D is a schematic diagram illustrating an exemplary MEMS during a settling operation.

FIG. 3D is a schematic representation of the MEMS (100-1) after the over driven reference voltage (350) has been applied to the variable capacitor (130-1). The variable capacitor is decoupled from node (340) by turning off the enable transistor (310). As a result, the variable capacitor (130-1) is electrically isolated from other circuitry, including the charge control circuit (125-1). While the variable capacitor (130-1) is in this isolated state, the two plates (135-1, 140-1) move toward each other in response to an attractive force caused by the charge differential between the first and second plates (135-1, 140-1).

The speed of the relative movement between the first and second plates (135-1, 140-1) as they move toward each other is related to the magnitude of the electrostatic attractive force as balanced by the spring force of the variable capacitor (130-1) as previously discussed. Accordingly, a relatively large attractive force causes the first and second plates (135-1, 140-1) to move toward each other more quickly. As a result, the plates move toward each other at a speed greater than that corresponding to the case where the plates are not overdriven.

As the first and second plates (135-1, 140-1) move toward each other, the variable gap distance (145-1) approaches the final desired value. If the over driven charge were allowed to remain on the variable capacitor (130-1) for a period longer than the mechanical time constant of the variable capacitor (130-1), the variable gap distance (145-1) may be smaller than the intended final value. To move the variable gap distance to its intended value, a pre-selected amount of charge may be removed from the variable capacitor (130-1) to allow the first and second plates (135-1, 140-1) to be moved to the final, desired value of the variable gap distance (145-1), as will be discussed in more detail below.

Figure 3E:
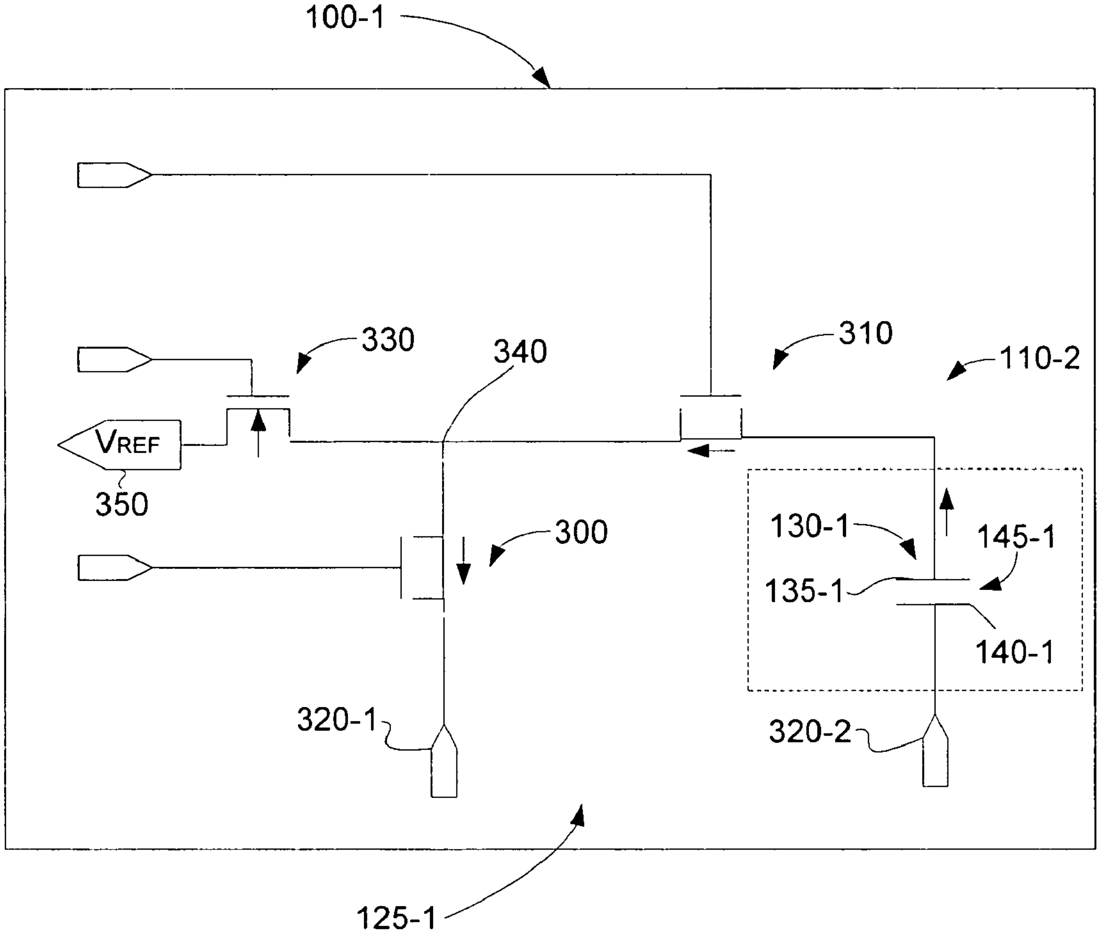
FIG. 3E is a schematic diagram illustrating an exemplary MEMS during a charge removal operation.

FIG. 3E is a schematic representation of the MEMS (100-1) as a pre-selected amount of charge is removed from the first conductive plate (135-1) of the variable capacitor (130-1). In order to remove a pre-selected amount of charge from the first plate (135-1), a path is established for a predetermined amount of time between the first plate (135-1) and the first clear node (320-1), which is at this time set to the overdrive compensation voltage. The path is established according to the same process described with reference to FIG. 3A, except that the first plate (135-1) of the variable capacitor (110-2) is not brought to the same voltage as the second plate (140-1). Instead, first clear node (320-1) is set to the overdrive compensation voltage. The overdrive compensation voltage is set to a level which corresponds with the pre-selected amount of charge that is to be removed. A conductive path is formed between the first plate (135-1) of the variable capacitor (130-1) and the first clear node (320-1) by turning on the charge transistor (310) and the clear transistor (300). The conductive path is then disestablished by turning off the charge transistor (310) after a duration that corresponds with the pre-selected amount of charge that is to be removed. Removing the pre-selected amount of charge from the first plate (135-1) results in a charge differential between the first and second plates (135-1, 140-1) that corresponds to the final value of the variable gap distance (145-1). Once the pre-selected amount of charge is removed from the first plate (135-1), the variable capacitor (130-1) is again electrically isolated from other circuitry, as described with reference to FIG. 3D.

In sum, FIGS. 3A-3E show schematic views of a circuit in which the $V_{REF}$ (350) is overdriven to lessen the time required to move the first and second plates (135-1, 140-1) to be separated by a final variable gap distance (145-1). The time required may be lessened by overdriving the $V_{REF}$ (350) and consequently the charge accumulated on the first plate, allowing the plates (135-1, 140-1) to move quickly toward each other in response to the charge differential between the first and second plates. After the first plate (135-1) has completed a portion of its travel towards the desired final mechanical state, a predetermined amount of the excess charge is removed from the variable capacitor (130-1) such that the charge differential corresponds to the final variable gap distance (145-1) allowing the variable gap distance (145-1) between the first and second plates (135-1, 140-1) to settle to its final value.

More specifically, the $V_{REF}$ (350) is coupled to the first plate (135-1) for a predetermined amount of time to over drive the charge differential between the first and second plates (135-1, 140-1). The variable capacitor (130-1) is then electrically isolated from other circuitry. While the variable capacitor (130-1) is isolated from other circuitry, the over driven charge differential causes the first and second plates (135-1, 140-1) to move more quickly toward each other. As the variable gap distance (135-1, 140-1) between the first and second plates (135-1, 140-1) approaches its final desired value, the surplus charge is removed by coupling the top plate (135-1) with first clear node (320-1), which is set at this time to the overdrive compensation voltage. The variable capacitor (130-1) is then again isolated from other circuitry while the variable gap distance (145-1) between the first and second plates (135-1, 140-1) settles to its final value.

As previously discussed, overdriving the voltage lowers the time required to move the variable gap distance (145-1) between the first and second plates (135-1, 140-1) to the final value of the variable gap distance (145-1). For example, according to one exemplary embodiment, the typical amount of time required to move a variable gap distance to from an initial gap distance of 4000 angstroms to within ±50 angstroms of a desired gap of 959 angstroms is about 3.145 μs. This time may be typical of a diffractive light device (DLD) having an 800 $\mu m^2$ area. Movement of the first and second plates by the voltage overdrive method may reduce this time to 1.045 μs or less. In an optical imaging application where these MEM devices are being used as light modulators, undesirable image artifacts can be minimized by reducing the travel time of the first and second plates (135-1, 140-1).

Figure 4:
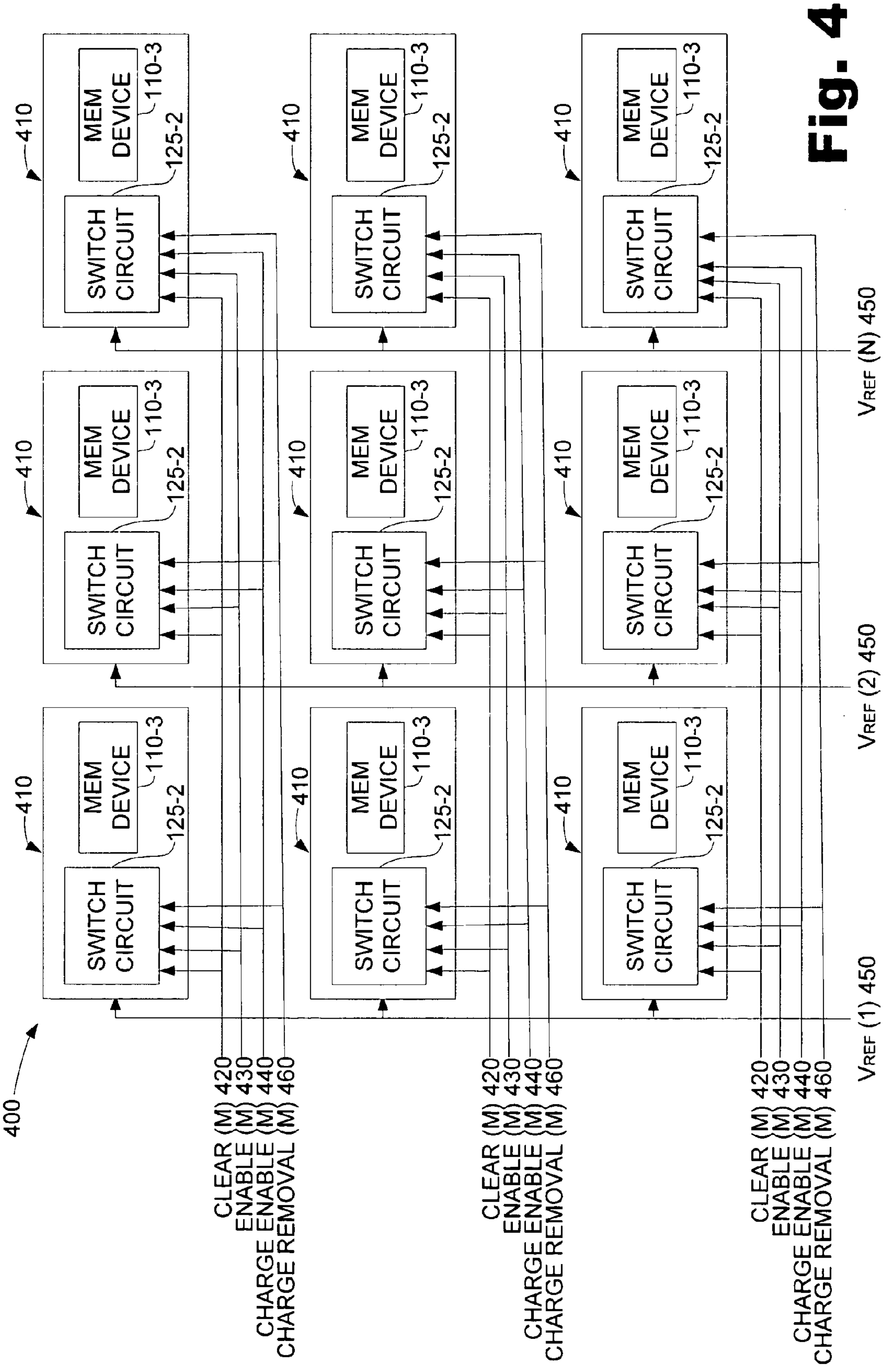
FIG. 4 is a block diagram illustrating an exemplary MEMS having a plurality of MEM cells in an M by N array.

FIG. 4 is a block diagram illustrating an exemplary microelectromechanical system (MEMS, 400). The MEMS (400) comprises an M-row by N-column array of MEM cells (410). Each of the MEM cells (410) includes a MEM device (110-3) and switch circuit (125-2). Although not illustrated for simplicity, each MEM device (110-3) further includes first and second conductive plates which form a variable capacitor separated by a variable gap distance as shown in FIGS. 3A-3D.

Each switch circuit (125-2) is configured to control the magnitude of a stored charge on the variable capacitor of its associated MEM device (110-3) to thereby control the associated variable gap distance. Each switch circuit (125-2) is also configured to provide a charge of magnitude larger than that corresponding to the final value of the variable gap distance. Each switch circuit (125-2) is also configured to withdraw a pre-selected amount of charge from the MEM device (110-3) such that the remaining charge corresponds to the final variable gap distance between the conductive plates.

Each row of the M rows of the array receives separate clear (420), enable (430), and charge (440) signals. All of the switch circuits (125-2) of a given row receive substantially the same clear and enable signals. Each column of the N columns of the array receives a separate reference voltage ($V_{REF}$, 450) for a total of N reference voltage signals.

To store or "write" a desired charge to each MEM device (110-3) of a given row of MEM cells (410), an overdriven reference voltage having a selected value is provided to each of the N columns, with each of the N reference voltage signals potentially having a differently selected value. The clear signal (420) and enable signal (430) are first "pulsed" to cause each of the switch circuits (125-2) of the given row to place the MEM device (110-3) in a known charge state. As previously discussed, the clear signal (420) and enable signal (430) may remove, or clear, any potential stored charge from its associated MEM device (110-3). The charge removal signal (460) is set to the first clear voltage at node 320-1 (FIG. 3A) to place the charge differential between the first and second plates at the known charge state. The charge enable signal (440) for the given row is then given to pre-charge the input nodes of each of the associated MEM device (110-3).

The enable signal (430) for the given row is then "pulsed" to cause each switch circuit (125-2) of the given row to apply its associated reference voltage to its associated MEM device (110-3) for the predetermined duration. As previously discussed, this reference voltage over drives the charge that accumulates on the variable capacitor. As a result, a charge having a magnitude larger than a charge based on the final value of the charge is stored on the associated variable capacitor to thereby force the variable gap distance toward its final value. Each MEM device (110-3) is then isolated from other circuitry as the over driven charge drives the conductive plates toward their desired position.

The clear signal (420) and enable signals (430) are again given to remove a selected amount of charge from the conductive plates. This clear pulse causes a similar result as the first clear pulse, but is "pulsed" for a shorter duration to remove only a selected amount of charge from the variable capacitors. Also, during this second clear pulse, the charge removal signal is set to the overdrive compensation voltage. Removing the selected amount of charge from the variable capacitor leaves a charge differential residing on the conductive plates that corresponds to the final variable gap distance between the conductive plates. After the selected amount of charge has been removed, the conductive plates are allowed to mechanically settle to their final value. This procedure is repeated for each row of the arrow to "write" a desired charge to each MEM cell (410) of the array.

In the implementations discussed with reference to FIGS. 1-4, the switch circuit (125, 125-1, 125-2) is configured to control voltage. In other implementations, the switch circuit (125, 125-1, 125-2) may be configured to control current. In such implementations the switch circuit may be a transistor that acts as a current source. For example, in the triode region the enable transistor could act as a resistor to control the current. Further, in the saturation region the enable transistor could directly act as a current source. As a result, a current pulse would accumulate on the input node (340). This pulse current would then be pulsed onto the variable capacitor to charge the variable capacitor as previously discussed.

The preceding description has been presented only to illustrate and describe the present method and apparatus. It is not intended to be exhaustive or to limit the method and apparatus to any precise form disclosed. Many modifications and variations are possible in light of the above teaching. It is intended that the scope of the invention be defined by the following claims.

What is claimed is:

1. A method of driving a parallel-plate variable micro-electromechanical capacitor, comprising:

establishing a first charge differential across a first and a second conductive plates of said variable capacitor wherein said first and second conductive plates are biased to a relative position and separated by a variable gap distance, and wherein said first charge differential causes relative movement between said conductive plates against said bias to narrow said variable gap distance;

isolating said first and second plates for a first duration; and decreasing said charge differential to a final charge differential being less than said first charge differential and wherein said second charge differential also causes attraction between said conductive plates against said bias and corresponds to a second value of said variable gap distance which is smaller than a gap distance between said conductive plates corresponding to said biased relative position.

2. The method of claim 1, further comprising isolating said first and second plates for a second duration after decreasing said charge differential.

3. The method of claim 2, wherein isolating said first and second plates for said second duration allows said first and second plates to mechanically settle to said second value of said variable gap distance.

4. The method of claim 1, wherein establishing said first charge differential comprises coupling said first conductive plates to a reference voltage source and coupling said second conductive plate to a clear voltage.

5. The method of claim 4, wherein said clear voltage comprises a second clear voltage coupled to said second conductive plate and wherein decreasing said charge differential comprises coupling said first conductive plate to a first clear voltage.

6. The method of claim 1, wherein said first charge differential causes an initial attractive force between said first and second conductive plates that is larger than a second attractive force corresponding to said second value of said variable gap distance.

7. The method of claim 1, wherein said parallel-plate variable MEM capacitor comprises a diffraction-based light modulation device.

8. A method of driving a diffraction-based light modulation device (DLD), comprising:

establishing a preliminary known charge state with respect to a first and a second conductive plate of a variable capacitor wherein said first and second conductive plates are separated by a variable gap distance;

establishing a first charge differential across said first and second conductive plates to force said first and second conductive plates toward each other;

isolating said first and second conductive plates for a first duration;

decreasing said charge differential to a second charge differential that also forces said first and second conductive plates toward each other, but said second charge differential being less than said first charge differential and wherein said second charge differential corresponds to a second value of said variable gap distance; and isolating said variable capacitor for a second duration to allow said first and second plates to settle to said second value of said variable gap distance.

9. The method of claim 8, wherein establishing said known charge state comprises coupling said first conductive plate to a first clear voltage and coupling second conductive plate to a second clear voltage.

10. The method of claim 8, wherein said first and second conductive plates are at substantially similar voltage levels.

11. The method of claim 8, wherein said first and second clear voltages comprise different voltage levels.

12. The method of claim 8, wherein establishing said first charge differential comprises coupling said first conductive plate to an overdriven reference voltage source.

13. The method of claim 8, wherein decreasing said charge differential comprises removing a selected amount of charge from said first conductive plate.

14. The method of claim 13, wherein removing said selected amount of charge comprises coupling said first conductive plate to an overdrive compensation voltage for a determined period of time.

15. The method of claim 8, wherein said variable capacitor is controlled by a voltage control circuit.

16. The method of claim 8, wherein said variable capacitor is controlled by a charge control circuit.

17. A method of operating a micro-electromechanical device comprising first and second plates that are capable of relative movement to vary a width of a gap between said first and second plates, and wherein said first and second plates are biased to a relative position with a first gap width between said plates, said method comprising:

applying a voltage difference to said two plates, said voltage difference creating an attractive force against said bias that narrows said gap between said two plates, wherein said voltage difference is greater than a second voltage difference corresponding to a desired second gap width, said voltage difference that is higher than said second voltage difference being applied to accelerate relative movement between said two plates to produce said desired second gap width between said plates; and, after applying said voltage difference, reducing said voltage difference between said two plates to said second voltage difference corresponding to said desired second gap width, wherein said second gap width is less than said first gap width.

18. The method of claim 17, further comprising reducing said voltage difference between said two plates to said second voltage difference before movement between said two plates reaches said desired second gap width.

19. The method of claim 17, wherein said second plate is fixed and said first plate moves relative to said second plate.

20. The method of claim 17, further comprising:

charging a node electrically disconnected from said two plates prior to applying said voltage difference; and electrically connecting said node with at least one of said plates to apply said voltage difference.

21. The method of claim 20, further comprising electrically isolating said two plates after applying said voltage difference by opening a switch between said node and at least one of said plates.

22. The method of claim 21, wherein said reducing said voltage difference is performed selectively electrically connecting at least one of said plates with a second node which is held at said second voltage corresponding to said desired second gap width.

23. The method of claim 17, wherein said desired second gap width corresponds to a desired capacitance between said two plates, said two plates being a variable capacitor.

24. The method of claim 17, wherein said desired second gap width corresponds to a wavelength of light to be output by a diffractive light device, said diffractive light device comprising said two plates.

25. The method of claim 17, further comprising, once said second voltage difference is applied, applying said second voltage difference until said gap between said first and second plates narrows to said desired second gap width.

* * * * *